(12) United States Patent
Renner

(10) Patent No.: US 10,159,992 B2
(45) Date of Patent: Dec. 25, 2018

(54) SPRAY HEAD AND SPRAYING APPARATUS

(71) Applicant: HUSQVARNA AB, Huskvarna (SE)

(72) Inventor: Thomas Renner, Ulm (DE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 15/565,277

(22) PCT Filed: Apr. 9, 2015

(86) PCT No.: PCT/EP2015/057713
§ 371 (c)(1),
(2) Date: Oct. 9, 2017

(87) PCT Pub. No.: WO2016/162064
PCT Pub. Date: Oct. 13, 2016

(65) Prior Publication Data
US 2018/0078953 A1    Mar. 22, 2018

(51) Int. Cl.
*B05B 1/18* (2006.01)
*B05B 1/30* (2006.01)
(Continued)

(52) U.S. Cl.
CPC ............... *B05B 1/185* (2013.01); *B05B 1/18* (2013.01); *B05B 1/3006* (2013.01); *B05B 1/323* (2013.01); *B05B 11/0016* (2013.01); *F16K 24/04* (2013.01)

(58) Field of Classification Search
CPC .. B05B 1/14; B05B 1/18; B05B 1/185; B05B 1/30; B05B 1/3006; B05B 1/3013;
(Continued)

(56) References Cited

U.S. PATENT DOCUMENTS 2,639,194 A * 5/1953 Wahlin .................... B05B 1/28
137/510
3,267,960 A * 8/1966 Warburton ............... B05B 1/14
137/517
(Continued)

FOREIGN PATENT DOCUMENTS

CN          1330495 C       8/2007
CN        103286013 A       9/2013
(Continued)

OTHER PUBLICATIONS

International Search Report and Written Opinion for International Application No. PCT/EP2015/057713 dated Dec. 21, 2015.
(Continued)

*Primary Examiner* — Darren W Gorman
(74) *Attorney, Agent, or Firm* — McNair Law Firm, P.A.

(57) ABSTRACT

A spray head includes a spray head base body (2) and a nozzle plate (3). The spray head base body (2) includes at least one liquid channel (4) for providing a liquid flow towards the nozzle plate (3). A drip-stop element (10) is located between the spray head base body (2) and the nozzle plate (3). The drip-stop element (10) includes at least one opening (11) being fluidly coupled with liquid channel (4) for providing a fluid flow into a space (6) between the drip-stop element (10) and the nozzle plate (3). At least a top portion (12) of the drip-stop element (10) is movably mounted within a spray head chamber (5) in order to perform a stroke movement. The top portion (12) is preloaded such that the top portion (12) rests against the nozzle plate (3) without applying any external forces to the top portion (12) and the top portion (12) is lifted off the nozzle plate (3) responsive to a liquid flow being provided through the liquid channel (4) into the space (6) between the top portion (12) and the nozzle plate (3).

18 Claims, 6 Drawing Sheets

(51) Int. Cl.
*F16K 7/14* (2006.01)
*F16K 7/17* (2006.01)
*F16K 24/04* (2006.01)
*B05B 1/32* (2006.01)
*B05B 11/00* (2006.01)

(58) Field of Classification Search
CPC ......... B05B 1/3033; B05B 1/304; F16K 7/14; F16K 7/17; F16K 24/04
See application file for complete search history.

(56) References Cited

U.S. PATENT DOCUMENTS

| | | | |
|---|---|---|---|
| 4,058,260 A * | 11/1977 | Lestradet | B05B 1/1645 239/394 |
| 6,382,531 B1 | 5/2002 | Tracy | |
| 6,484,329 B1 | 11/2002 | Duncan | |
| 7,537,175 B2 | 5/2009 | Miura et al. | |
| 7,770,825 B2 | 8/2010 | Kajuch | |
| 2005/0151778 A1 | 7/2005 | Nishi et al. | |
| 2008/0265064 A1 | 10/2008 | Keren | |
| 2012/0325928 A1 * | 12/2012 | Gransow | B05B 1/16 239/8 |
| 2015/0196927 A1 * | 7/2015 | Ramos De Barros | B05B 1/3006 239/107 |

FOREIGN PATENT DOCUMENTS

| | | |
|---|---|---|
| CN | 203803671 U | 9/2014 |
| JP | 2010220919 A | 10/2010 |
| JP | 2012143468 A | 8/2012 |
| JP | 2015109997 A | 6/2015 |
| RU | 2280356 C2 | 7/2006 |
| RU | 2397825 C2 | 8/2010 |
| WO | 2006035792 A1 | 4/2006 |
| WO | 2009017489 A1 | 2/2009 |
| WO | 2014029636 A2 | 2/2014 |

OTHER PUBLICATIONS

International Preliminary Report on Patentability for International Application No. PCT/EP2015/057713 dated Mar. 17, 2017.

* cited by examiner

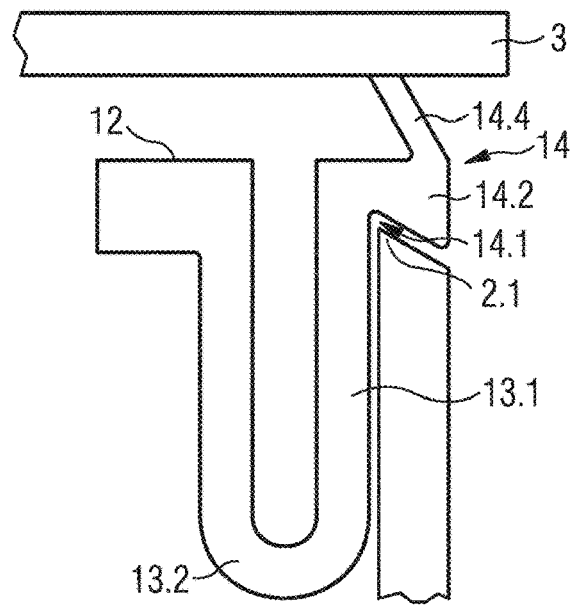
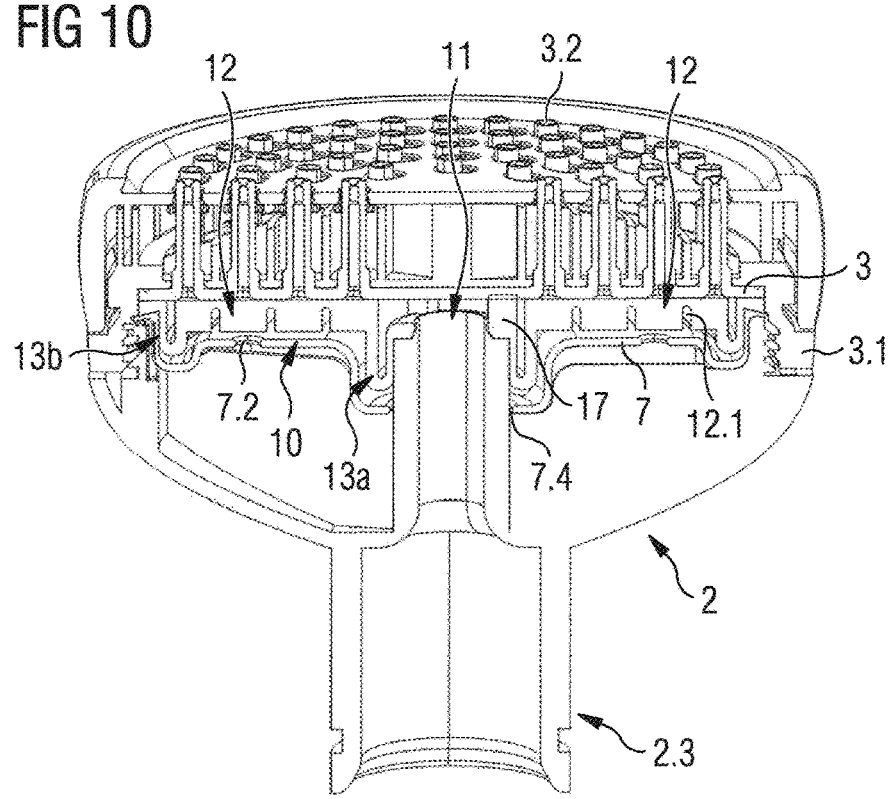

SPRAY HEAD AND SPRAYING APPARATUS

The present invention relates generally to the field of spray heads. More specifically, the present invention is related to a spray head including a drip-stop element in order to avoid dripping or running empty of the spray head after stopping the irrigation process.

BACKGROUND OF THE INVENTION

Spray heads, specifically spray heads of shower head type, are well-known in prior art. After stopping the irrigation process, spray heads comprising a large shower head diameter include a large amount of residual liquid within the spray head. Due to gravitational force, said residual liquid drops out of the spray head. Said dripping out is noticed by a user as leakage. In addition, there is the problem that said residual liquid may freeze within the spray head thereby damaging the spray head.

SUMMARY OF THE INVENTION

It is an objective of the embodiments of the present invention to provide a spray head which avoids residual liquid (specifically water) in the interior of the spray head. The objective is solved by the features of the independent claims. Preferred embodiments are given in the dependent claims. If not explicitly indicated otherwise, embodiments of the invention can be freely combined with each other.

According to an aspect of the invention, the invention relates to a spray head. The spray head comprises a spray head base body and a nozzle plate being attached to the spray head base body. The spray head base body comprises at least one liquid channel for providing a liquid flow through the spray head base body towards the nozzle plate. In order to avoid residual liquid within the spray head, a drip-stop element is located between the spray head base body and the nozzle plate. Said drip-stop element comprises at least one opening being fluidly coupled with said liquid channel for providing a fluid flow into a space between the drip-stop element and the nozzle plate. At least a top portion of said drip-stop element is movably mounted within a spray head chamber in order to perform a stroke movement. The top portion of the drip-stop element is preloaded such that said top portion rests against the nozzle plate or an intermediate member and said top portion is lifted off the nozzle plate or said intermediate member in case that a liquid flow is provided through the liquid channel into the space between said top portion and the nozzle plate or intermediate member. Said intermediate member may be a single component, e.g. a plate shaped component comprising liquid openings for providing a liquid flow through said intermediate member. Said intermediate member may be a loosely inserted member which reduces the assembly forces.

Advantageously, due to the drip-stop element a slow dripping or running empty of the spray head after the irrigation process is avoided. In addition, the frost resistance is increased because after stopping the irrigation process, liquid included in the spray head is removed from the interior of the spray head. Furthermore, the weight of the shower head is reduced thereby improving the handling of the shower head. Finally, calcification effects and growth of algae are significantly reduced.

According to embodiments, the drip-stop element is constituted by a membrane made of an elastic material. Thereby, the stroke movement and restoring of the top portion is obtained due to the elasticity of the drip-stop element. The drip-stop element may be formed as a one-piece-membrane including fixing means for coupling the drip-stop element at the spray head base body.

According to embodiments, the top portion is adapted to the contour of the nozzle plate in order to provide a form-fit surface resting against the nozzle plate. So, after stopping the irrigation process, the top portion is moved towards the nozzle plate thereby removing the residual liquid out of the spray head. Due to the form-fit of the top portion, the top portion may completely lie against the nozzle plate thereby removing essentially the whole amount of residual water out of the spray head.

According to embodiments, the drip stop element is coupled with the spray head base body by means of at least one coupling portion, said coupling portion being constituted by flexible U-shaped or zigzag-shaped material portions. Said coupling portion may form a diaphragm comprising a pair of two parallel legs (U-shaped coupling portion) wherein due to a rolling movement, the length of the legs can be varied, i.e. one of said legs is elongated and the further leg is shortened. The coupling portion is adapted to return to its initial position, thereby causing a reversible stroke movement of the top portion. In addition, further coupling portions may be provided close to the opening for providing a passage for liquid provided by the liquid channel or close to nozzle passages provided within the drip-stop element.

According to embodiments, the coupling portion, in the following also referred to as rolling diaphragm, is adapted to preload the top portion of the drip-stop element towards the nozzle plate. When stopping the liquid flow through the spray head, the top portion returns in a position adjacent to the nozzle plate (e.g. due to preload forces applied by the elastic coupling portions) thereby removing residual liquid out of the spray head. In other words, the restoring force of the membrane-type drip-stop element forces the top portion into an upper position. In said upper position, the top portion rests against the nozzle plate or is close to the nozzle plate thereby expelling residual liquid out of the spray head. The preload forces applied to the top portion of the drip-stop element mainly depends on the shore hardness of the coupling portion (rolling diaphragm), the material thickness of the coupling portion and the length of the legs of the U-shaped coupling portion (rolling diaphragm.)

According to embodiments, the drip-stop element comprises a sealing portion providing a sealing between the spray head base body and the nozzle plate. The sealing portion may be a ring-shaped sealing portion forming the outer edge of the drip-stop element. Said sealing portion may be adapted to be arranged between an upper edge of the spray head base body and the nozzle plate in order to seal the spray head circumferentially. The sealing portion may be an integral part of the single-piece drip-stop element. Thereby, additional sealing elements can be avoided.

According to embodiments, the sealing portion comprises a recess for receiving a corresponding protrusion of the spray head base body. Said recess may be formed by the radially outer leg of the coupling portion and a rim radially protruding from said coupling portion. The angle confined between the rim and the outer leg may be smaller than 90°, e.g. smaller than 80°, specifically smaller than 70°. Thereby, a form-fit between the sealing portion and the spray head base body is obtained. Said form-fit ensures that the sealing portion does not move radially inwardly during the assembling process. Preferably, the top portion of the drip-stop element is preloaded during the assembling process, i.e. the top portion is pressed downwardly against the restoring force of the coupling portion (rolling diaphragm). Said preloading may result in a deformation of the sealing portion which is prevented by the protrusion of the spray head base body received in the recess formed beneath, respectively close to the sealing portion.

According to embodiments, the sealing portion comprises an angular-shaped sealing rim comprising an acute-angled edge or slanted sealing lip, said acute-angled edge or slanted sealing rim interacting with the nozzle plate in order to increase the sealing effect. For example, the acute-angled edge forms a triangular edge which is provided at the top portion of the sealing rim. In case of a slanted sealing lip, said sealing lip may be slanted inwardly. When pressing the nozzle plate onto said acute-angled edge or slanted sealing lip, the top portion of the acute-angled edge, respectively the sealing lip is deformed thereby obtaining a bead which further enhances the liquid tightness between the nozzle plate and the spray head base body.

According to embodiments, the drip-stop element comprises at least one aperture for providing a spraying nozzle passage. For example, the spray head may comprise multiple irrigation modes wherein a first irrigation mode is of shower type and a second irrigation mode may be of jet type provided through a spraying nozzle. There may be a sealing provided around the spraying nozzle, said sealing being an integral part of the drip-stop element. In addition, a coupling portion may be provided around the spraying nozzle passage enabling a stroke movement of the top portion of the drip-stop element whereas the sealing around the spraying nozzle passage is stationary mounted.

According to embodiments, the spray head base body comprises at least one vent opening. Said vent opening may be arranged in the outer wall of the spray head base body. Due to the vent opening, air displaced by the stroke movement may be able to escape out of the interior of the spray head. Thereby, the movement of the top portion is not blocked by compressed air.

According to embodiments, a support element is provided referring to the liquid flow direction in front of the drip-stop element in order to limit the movement of the top portion of the drip-stop element. The support element may comprise one or more support portions formed by one or more protrusions. Said support portions may provide stop portions for limiting the stroke movement of the top portion. Thereby, an undesired overstretching of the drip-stop element is avoided.

According to embodiments, the support element comprises one or more elastic ribs, said elastic ribs being adapted to support the restoring properties of the drip-stop element. Said elastic ribs may protrude in the direction towards the top portion of the drip-stop element. When moving the top portion of the drip-stop element towards the support element, the elastic ribs are reversibly bent. When stopping the irrigation process, the restoration of the elastic ribs supports the movement of the top portion back to its starting position, in which the top surface of the top portion lies against the nozzle plate.

According to embodiments, the support element comprises one or more vent openings. The air displaced by the moving top portion may escape through said vent openings provided in the support element out of the space between the support element and the drip-stop element and may than escape out of the interior of spray head base body through vent openings provided in the outer wall of the spray head base body. Thereby, the movement of the top portion of the drip-stop element is not blocked by compressed air.

According to embodiments, the nozzle plate and the drip-stop element are constituted by a one-piece element. For example the nozzle plate may be made of rubber or silicone and may comprise one or more nozzles being integrally formed at the nozzle plate. The nozzle plate and the drip stop element may be manufactured in a single injection moulding process. The nozzle plate may be coupled with the drip-stop element by means of a hinge portion, specifically a film hinge in order to enable a positioning of the nozzle plate above the drip-stop element.

According to a further aspect, the invention relates to a spraying apparatus. The spraying apparatus may comprise a spray head as described above. More in detail, the spraying apparatus may be a hand-held spraying apparatus being adapted to provide liquid, specifically water to liquid receiving objects. The spraying apparatus may be a spraying apparatus for outdoor purposes or a shower head for sanitary facilities.

The term "essentially" or "approximately" as used in the invention means deviations from the exact value by +/−10%, preferably by +/−5% and/or deviations in the form of changes that are insignificant for the function.

BRIEF DESCRIPTION OF THE DRAWINGS

The various aspects of the invention, including its particular features and advantages, will be readily understood from the following detailed description and the accompanying drawings, in which:

FIG. 9 shows a further embodiment of a sealing of the spray head based on the drip-stop element in greater detail;

FIG. 10 shows a further embodiment of a spray head with a nozzle plate and a drip-stop element in a lateral sectional view.

DETAILED DESCRIPTION OF PREFERRED EMBODIMENTS

Figure 1:
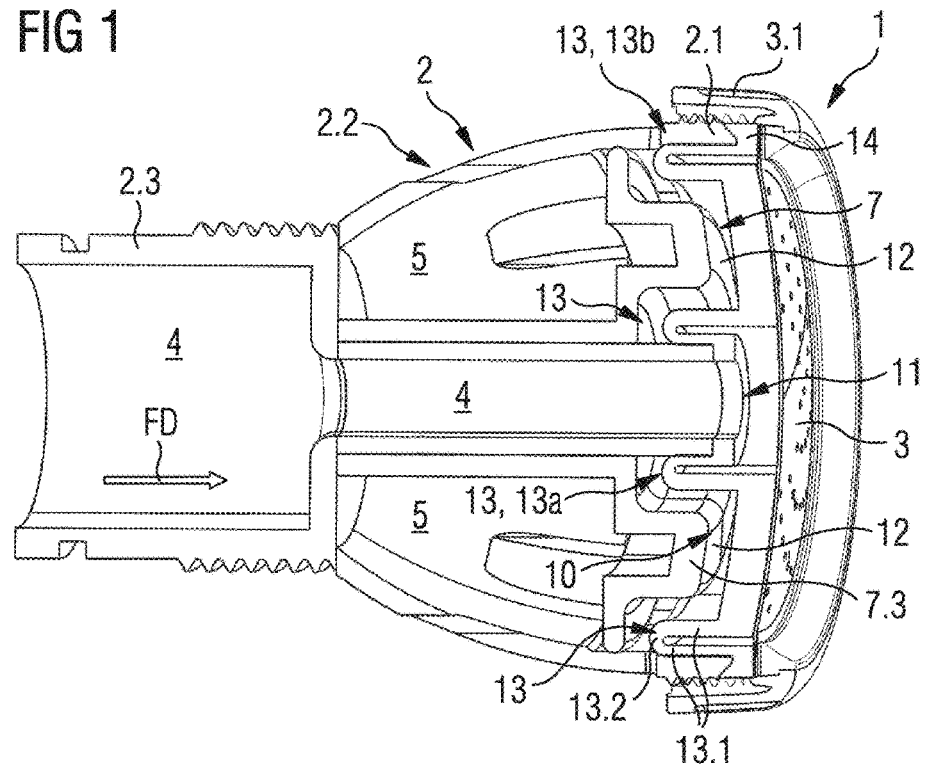
FIG. 1 shows a spray head without applying a liquid flow through a liquid channel provided in the interior of the spray head in a lateral sectional view.

The present invention will now be described more fully with reference to the accompanying drawings, in which example embodiments are shown. However, this invention should not be construed as limited to the embodiments set forth herein. Throughout the following description similar reference numerals have been used to denote similar elements, parts, items or features, when applicable.

FIG. 1 shows a spray head 1 being adapted to be used in a spraying apparatus, e.g. a spray gun for supplying water to flowers or plants or a shower head used in bath rooms. The spray head 1 comprises a spray head base body 2 and a nozzle plate 3 being attached to the spray head base body 2 by means of a threaded ring 3.1, i.e. the spray head base body 2 comprises an external thread and the threaded ring 3.1 is adapted to be screwed onto said external thread for securing the nozzle plate 3 at the spray head base body 2. The spray head 1 may further comprise a coupling portion 2.3 for coupling the spray head 1 with a spraying apparatus base body.

The spray head base body 2 comprises a liquid channel 4 for providing a guided liquid flow from the coupling portion 2.3 to the nozzle plate 3. The liquid may flow through the liquid channel 4 in a certain flow direction FD (illustrated by an arrow in FIG. 2) The nozzle plate 3 may be made of a sheet material, said sheet material comprising a plurality of openings for providing a shower-like liquid flow through the nozzle plate 3. Said openings may be spatially distributed over the nozzle plate 3 in order to provide a smooth irrigation. The nozzle plate 3 may be made of any suitable material, for example, metal, plastic, rubber or silicone. The openings of the nozzle plate 3 may be constituted by bores or by nozzles.

In order to avoid slow dripping or running empty of the spray head 1 after the irrigation process, the spray head 1 further comprises a drip-stop element 10. Said drip-stop element 10 may be arranged within a spray head chamber 5 included in the interior of the spray head 1. More in detail, the drip-stop element 10 may be arranged between the coupling portion 2.3 and the nozzle plate 3, i.e., referring to the flow direction in front of the nozzle plate 3. The drip-stop element 10 comprises an opening 11 being fluidly coupled with the liquid channel 4 in order to provide a liquid flow through the drip-stop element 10.

FIG. 1 shows the situation when no liquid flow is provided through the liquid channel 4 towards the nozzle plate 3. The top portion 12 of the drip-stop element 10 is preloaded such that the top surface of top portion 12 is pressed against the rear side of the nozzle plate 3. The means for said preloading may be integral preloading means, i.e. at least one integral part of the drip-stop element 10 or external preloading parts, e.g. at least one spring or spring like member being adapted to press the drip-stop element 10 in an upper position. The preloading means are described in closer detail below.

In case that a liquid flow is provided through the liquid channel 4 (FIG. 2), especially when liquid with a pressure above a certain pressure threshold (e.g. a pressure higher than 0.5 bar) is provided to the nozzle plate 3, the top portion 12 of the drip-stop element 10 is lifted off the nozzle plate 3. Thereby a space 6 between the nozzle plate 3 and the top portion 12 of the drip-stop element 10 is established which receives said liquid provided by the liquid channel 4 and all openings of the nozzle plate 3 are supplied with liquid.

Figure 2:
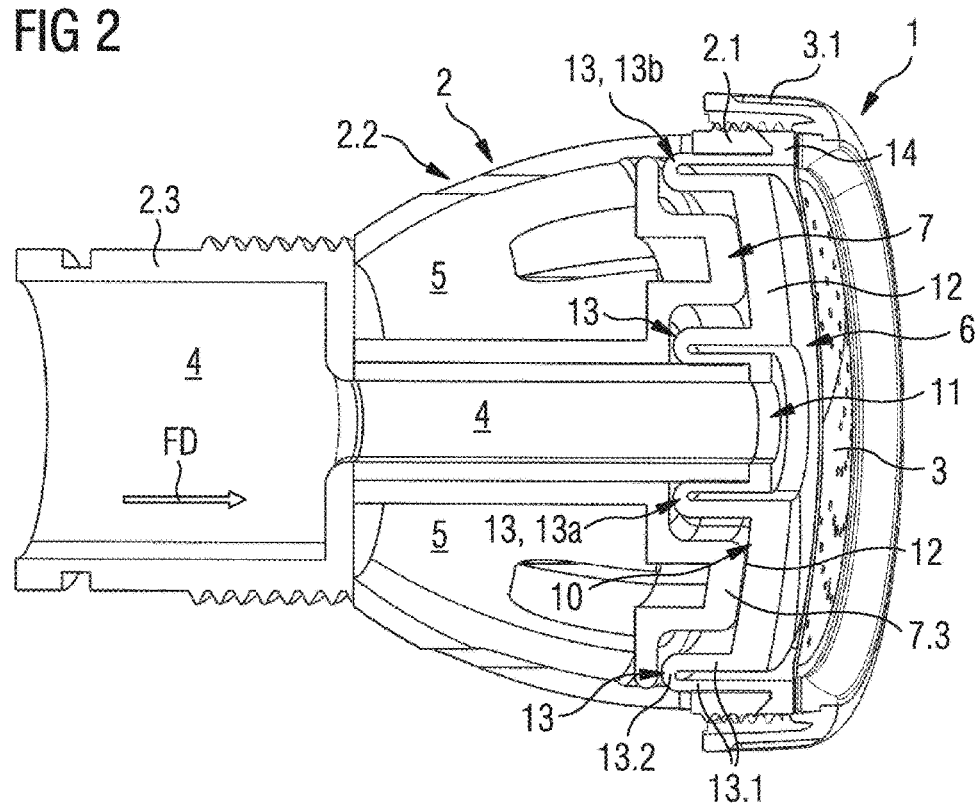
FIG. 2 shows a spray head when applying a liquid flow through the liquid channel in a lateral sectional view.

As shown in FIGS. 1 and 2, the top portion 12 of the drip-stop element 10 may comprise a circular ring shape wherein in the centre of the drip-stop element 10 the opening 11 (for enabling the liquid flow through the drip-stop element 10) is provided. Thereby a uniform pressure distribution within space 6 and an even distribution of liquid along the nozzle plate are achieved. When the liquid flow through the spray head 1 is stopped, the top portion 12 of the drip-stop element 10 is pressed towards the nozzle plate by upper-mentioned preloading means thereby removing the liquid out of space 6 and thereby avoiding a dripping or running empty of the spray head 1. In other words, the top portion 12 of the drip-stop element 10 performs a stroke movement within the spray head chamber 5, said stroke movement removing the residual liquid out of the spray head thereby avoiding a draining of the spray head 1 after finishing the irrigation process. Depending on the movability of the top portion 12 and the preloading means, the drip stop portion 10 may also provide a pressure regulator within the spray head 1 because in case of pressure variations, the top portion 12 may be displaced thereby at least partially smoothing said pressure variations.

Figure 3:
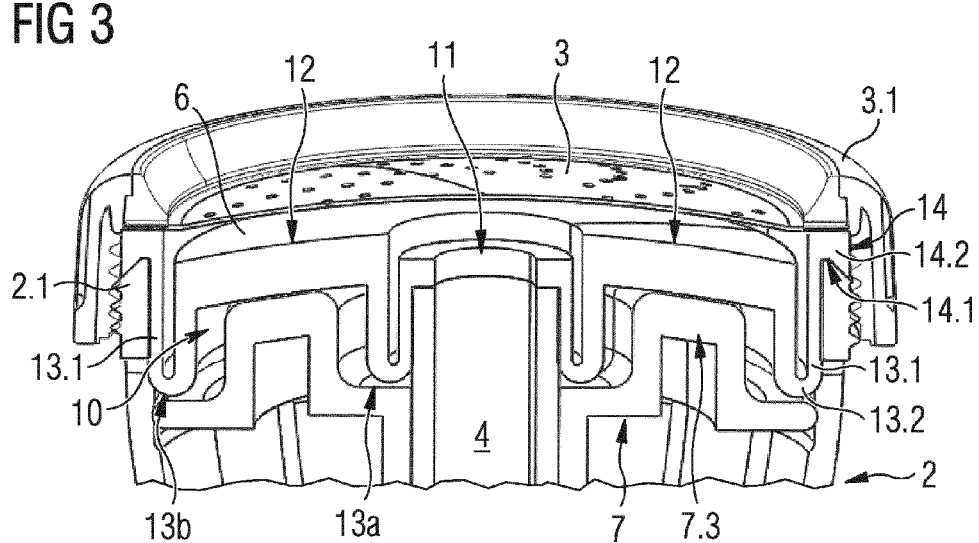
FIG. 3 shows a detailed sectional view of the spray head according to FIG. 2.

FIG. 3 shows drip-stop element 10 is closer detail. According to the present embodiment, the preloading means of the drip-stop element 10 are formed by coupling portions 13, said coupling portions comprising a U-shaped cross section. In other words, the coupling portions 13 are built by wrinkles which comprise two parallel or essentially parallel legs 13.1 coupled via a bending portion 13.2. Specifically, a first coupling portion 13a may be arranged in the centre of the drip-stop element 10 surrounding the opening 11 and a second coupling portion 13b may be arranged close to the outer wall of the spray head base body 1. In other words, the coupling portion 13 is a rolling diaphragm.

The coupling portions 13 may be adapted to preload the top portion 12 towards the nozzle plate 3 based on forces caused by the elasticity of the material of the coupling portions 13. For example, the drip-stop element 10 including the coupling portions 13 is integrally formed and may be made of an elastic material, e.g. rubber or silicone. So, the axial movement of the top portion 12 is done by a rolling movement of the coupling portion 13 wherein a first leg 13.1 of the coupling portion 13 is extended and a second leg 13.1 of the coupling portion 13 is shortened. Thereby, a reliable movement of the top portion 12 without any friction between the drip-stop element 10 and the spray head base body 2 is obtained. The shore-hardness and the thickness of the wall of the coupling portion 13 influences the resilience properties of the coupling portion 13 and therefore the period of time needed for pushing residual water out of the spray head 1.

Figure 4:
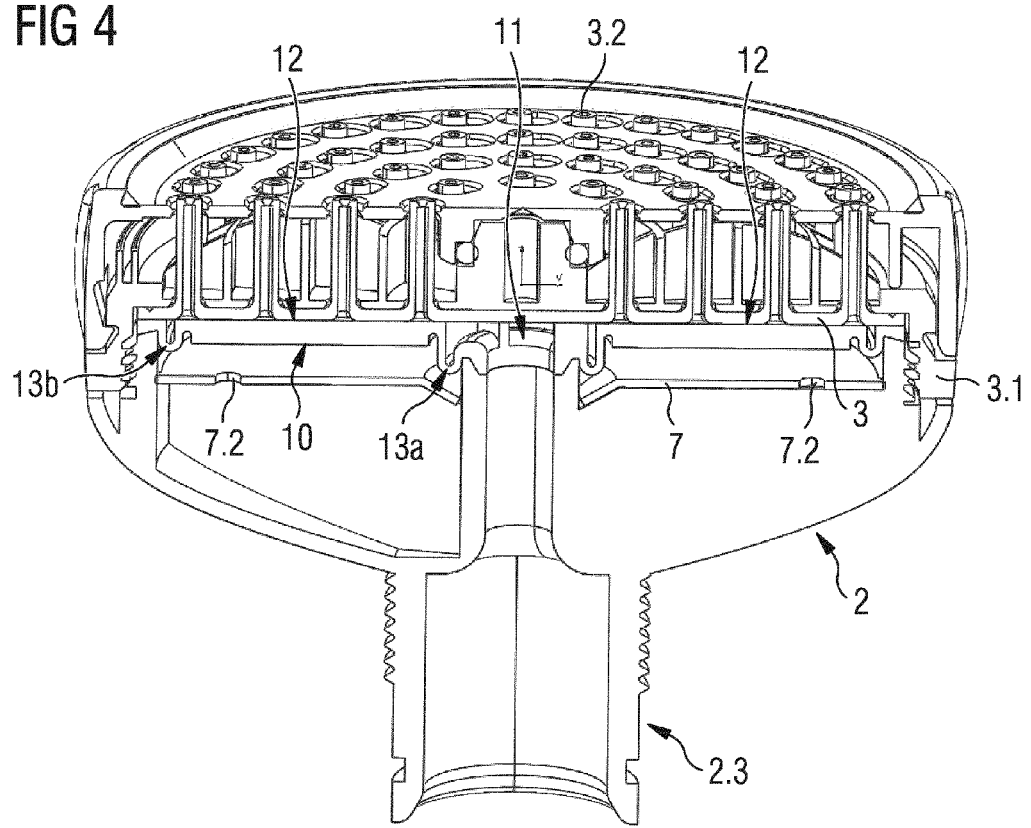
FIG. 4 shows a spray head with a nozzle plate being integrally formed at the drip-stop element in a lateral sectional view.

FIG. 4 shows a further embodiment of the drip-stop element 10. Said drip-stop element 10 is integrally formed with a nozzle plate 3 comprising a plurality of nozzles 3.2. So, the nozzle plate 3 is made from the same material, e.g. an elastic material, e.g. silicone. The drip-stop element 10 may be coupled with the nozzle plate 3 via a hinge portion, e.g. a film hinge. Thereby, the nozzle plate 3 and the drip-stop element 10 can be manufactured in a single manufacturing step (e.g. an injection moulding process using a single injection mould). In addition, the number of parts can be reduced and the assembly process can be streamlined.

Figure 5:
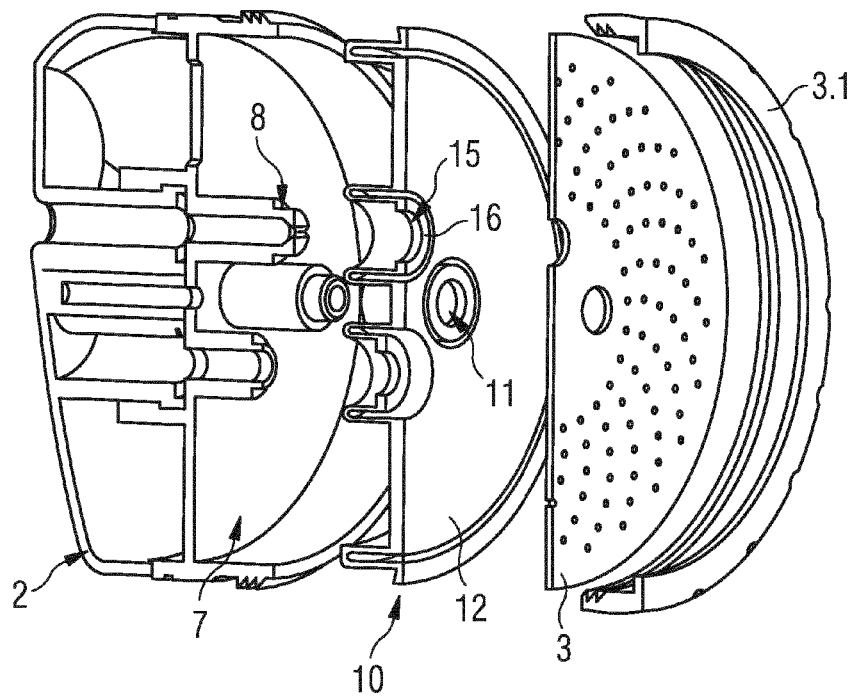
FIG. 5 shows a shower-type spray head including a nozzle for performing at least one further irrigation mode in an exploded view.
Figure 6:
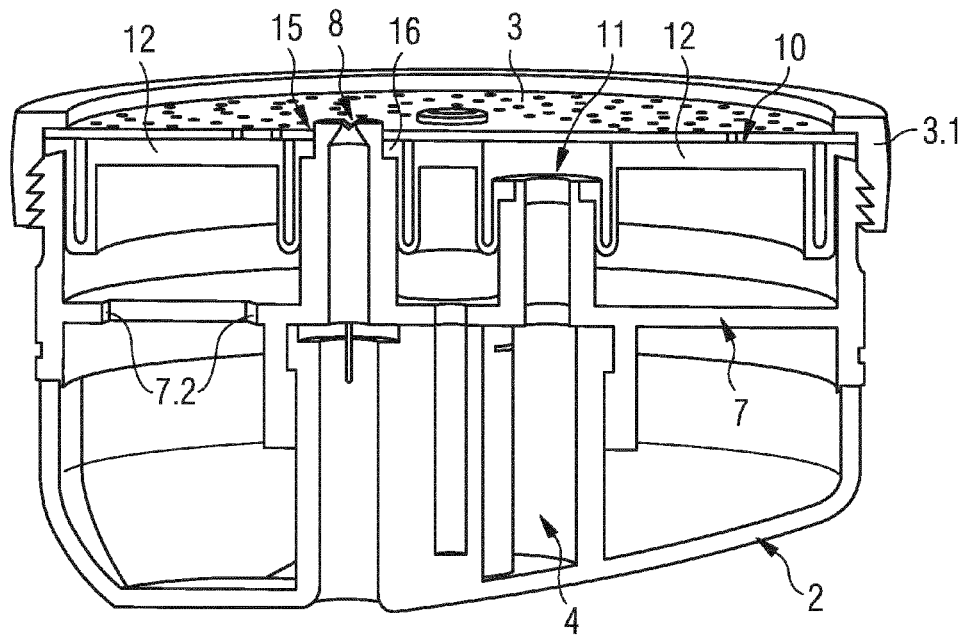
FIG. 6 illustrates the spray head according to FIG. 5 in an assembled state.

FIGS. 5 and 6 shows embodiments of a spray head 1 which include a nozzle plate for dispensing liquid in a first irrigation mode and—additionally—one or more nozzles 8 through which liquid is dispensed in at least one second irrigation mode. Said nozzles 8 will be passed through the drip-stop element 10 via an aperture 15.

In order to seal the passage of said nozzle 8 or the connection area between the liquid channel 4 and space 6 receiving liquid for lifting the top portion off the nozzle plate 3, the drip-stop element 10 comprises multiple sealing portions. For providing a liquid tight junction between the drip-stop element 10 and the side wall of the nozzle 8, respectively, the wall of the liquid channel 4, said walls comprise a stepped shape. The drip-stop element 10 comprises a sealing edge being adapted to said stepped shape.

Said sealing edge 16 comprising an upper surface which is adapted to receive liquid pressure in order to press the sealing edge 16 towards the step provided around the nozzle 8, respectively, the liquid channel 4 thereby reinforcing the sealing effect. Furthermore, the outer surface of the leg 13.1 of the connection portion 13 provided around the nozzle 8, respectively, the liquid channel 4 abuts against the outer wall of the nozzle 8, respectively, the liquid channel 4. When applying liquid under pressure into space 6, the sealing edge 16, respectively the leg 13.1 is pressed against the wall of the nozzle 8, respectively, the liquid channel 4 thereby increasing the sealing effect. This effect is even reinforced due to the pocket-like shape of the connection portion 13.

In order to avoid a blockage of movement of the top portion 12 of the drip-stop element 10 due to compression of air included in the spray head base body 2, there are vent openings 2.2 provided in the side wall of the spray head base body 2. When moving the top portion 12 of the drip-stop element 10 within the spray head base body 2 downwardly, the displaced air is able to escape through said vent openings 2.2 (FIG. 1 and FIG. 2).

Referring to FIGS. 1 to 3, the spray head 1 may comprise a support element 7. Said support element 7 may be arranged below the drip-stop element 10, i.e. between the drip-stop element 10 and the coupling portion 2.3. The support element 7 may comprise one or more support portions being adapted to limit the stroke movement of the moveable portion of the drip-stop element 10, i.e. the top portion 12. For example, the support portions may be constituted by one or more protrusions 7.3 which are adapted to form contact surfaces for the bottom of the top portion 12. In case that liquid with high liquid pressure is provided via the liquid channel 4 towards the nozzle plate 3, the top portion 12 is lifted from the nozzle plate 3 and moved until the bottom of the top portion 12 meets the support portions. Thereby, an overstretching or destruction of the coupling portions 13 is avoided. Furthermore, the support element 7 may comprise one or more ribs being adapted to be bent by the stroke movement of the top portion 12 thereby supporting the movement of the top portion 12 back towards the nozzle plate 3 when the liquid flow through the spray head 1 is stopped.

According to preferred embodiments, the support element 7 comprises one or more vent openings 7.2. Due to the stroke movement of the top portion 12 of the drip-stop element 10, air is displaced. Said air may escape through the vent openings 7.2 and the vent openings 2.2 out of the spray head base body 2 thereby avoiding a blocking of stroke movement.

Figure 7:
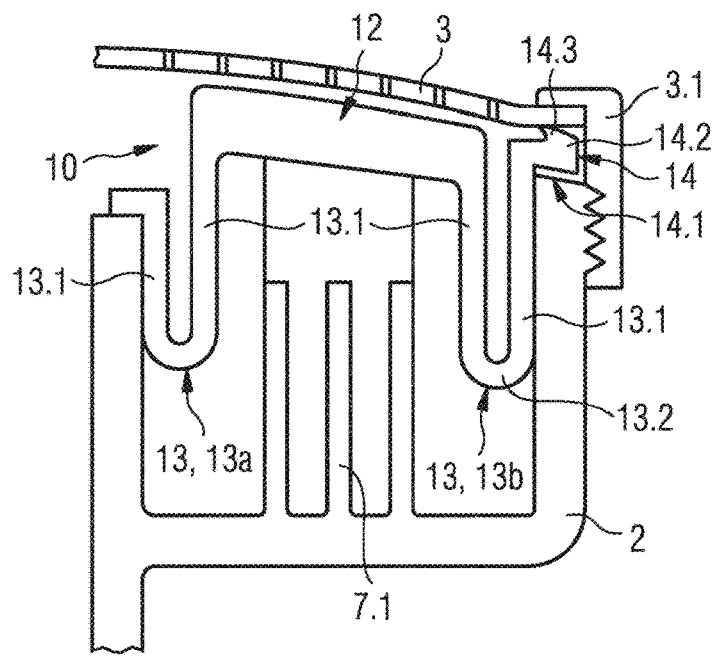
FIG. 7 illustrates the sealing of the spray head by using the drip-stop element based on a lateral sectional view of the spray head.
Figure 8:
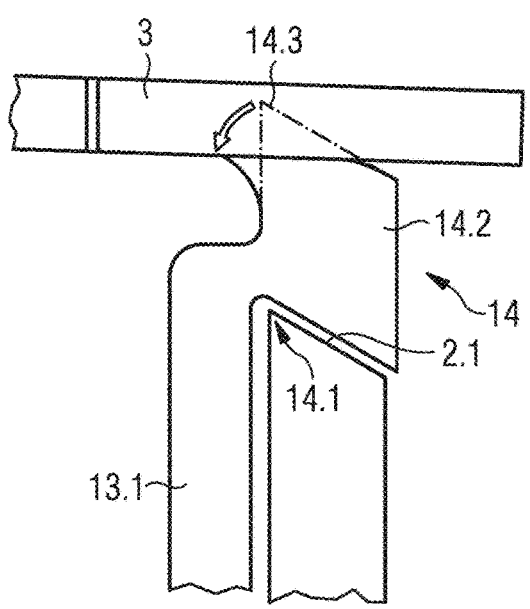
FIG. 8 shows the sealing of the spray head based on the drip-stop element in greater detail.

FIGS. 7 and 8 show the sealing of the spray head 1 at its outer side in closer detail. As already mentioned before, the drip-stop-element 10 comprises a sealing portion 14 adapted to seal the connection portion between the nozzle plate 3 and the spray head base body 2. In other words, a sealing portion 14 is integrally formed at the drip-stop-element 10. At the bottom side, the sealing portion 14 may comprise a recess 14.1 for receiving a corresponding edge or protrusion 2.1 of the spray head base body 2. The recess 14.1 may be formed by a leg 13.1 of the coupling portion 13 being arranged in parallel to a wall portion of the spray head base body 2 and an extension radially protruding from said leg 13.1 and forming a sealing rim 14.2. Preferably, said leg 13.1 and said radial extension may draw an angle smaller than 90°, preferably, smaller than 75°. The edge or protrusion 2.1 of the spray head base body 2 may show a corresponding angle in order to match into said recess 14.1.

At the top portion of the sealing rim 14.2 an acute-angled edge 14.3 may be provided. Said acute-angled edge 14.3 may be adapted to interact with a planar portion of the nozzle plate 3 in order to provide a sealing between said sealing rim 14.2 and the nozzle plate 3. The acute-angled edge 14.3 may be adapted such that, when pressing the nozzle plate 3 against the sealing rim 14.2 by means of the threaded ring 3.1, the tapered, acute-angled edge 14.3 is bent inwardly (towards the central axis of the spray head 1). Thereby a bead is provided which increases the tightness of the spray head 1.

The spray head 1 may be construed such that at least the nozzle plate 3 and the drip-stop element can be removed from the spray head 1 in order to be able to clean the interior of the spray head 1. According to the present embodiment, the spray head 1 can be disassembled by removing the treaded ring 3.1.

FIG. 9 shows a further embodiment of a sealing portion 14 provided at the drip-stop element 10. The sealing portion 14 comprises at its sealing rim 14.2 a slanted sealing lip 14.4. Said sealing lip 14.4 protrudes upwardly an is adapted to interact with a planar portion of the nozzle plate 3 in order to provide a sealing between said sealing rim 14.2 and the nozzle plate 3. Preferably, the sealing lip 14.4 is slanted inwardly, i.e. towards the central axis of the spray head 1. The sealing lip 14.4 may be adapted such that, when pressing the nozzle plate 3 against the sealing rim 14.2 by means of the threaded ring 3.1, the sealing lip 14.4 is bent inwardly (towards the central axis of the spray head 1). Thereby, the tightness of the spray head 1 is increased.

FIG. 10 shows a further embodiment of a spray head 1 which comprises a similar technical structure as the spray head 1 described above in connection with FIG. 4. The basic structure of the spray head 1 according to the present embodiment is identical with the embodiment of FIG. 4, so only the differences are explained in the following. With respect to other features of the embodiment of FIG. 10, reference is made to the preceding description.

A first main difference is that the drip-stop element 10, specifically the top portion 12 comprises one or more recesses 12.1. Said recesses may be arranged at the bottom side of the top portion 12, i.e. at the side opposite to the nozzle plate 3. For example, said recesses 12.1 may comprise an annular shape. More specifically, at least one ring-shaped recess 12.1 may be arranged centered with respect to the central axis of the spray head 1. In case that multiple ring-shaped recess 12.1 are provided at the top portion 12, said recesses may be arranged concentric. By means of said recesses 12.1, the deformation of the drip-stop element 10 can be designed. So, for example, a step-wise activating of circular rows of nozzles 3.2 is possible because depending on the liquid pressure provided into the space between the nozzle plate 3 and the drip-stop element 10, liquid is only provided to the inner nozzles 3.2 or liquid is provided to all nozzles 3.2 of the nozzle plate 3.

Furthermore, in addition to the vent openings 7.2, the support element comprises a vent channel 7.4. Said vent channel 7.4 may be a central vent channel, i.e. the vent channel 7.4 may be arranged around the liquid channel 4. Said vent channel 7.4 may provide an additional passage for air displaced by the stroke movement of the drip-stop element 10.

In case of large-area spray heads 1, the drip-stop-element 10 may be preloaded over its entire surface area. The stroke movement of the top portion 12 is obtained due to an elastic compression of the whole top portion 12. Preferably, the drip-stop-element 10 is designed such that the top portion 12 is pressed against the nozzle plate 3 or an intermediate member arranged between the top portion 12 and the nozzle plate 3. Thereby, all openings of the nozzles 3.2 are tightly sealed and a dripping-out of liquid comprised within the nozzles 8 is prevented.

In addition, the drip-stop element 10 according to FIG. 10 comprises one or more hold-down-portions 17. Said hold-down-portions 17 may be arranged close to the center of the drip-stop element 10 and may be formed by multiple evenly distributed ribs. More specifically, said hold-down-portions 17 may be arranged around the opening of the liquid channel 4, through which liquid flows into the interior of the spray head 1. For example, the hold-down-portions 17 may be constituted by ribs. By means of said hold-down-portions 17, the drip-stop element 10 is reliably positioned because the hold-down-portions 17 ensure a pressing of the drip-stop element 10 against the outlet of the liquid channel 4 by means of the nozzle plate 3 or an intermediate member arranged between the nozzle plate 3 and the drip-stop element 10. In other words, said hold-down-portions 17 press the drip-stop element 10 in a liquid-tight manner onto an annular rib provided around the opening of the liquid channel 4. Thereby, a liquid leakage due to an incorrect assembling of the drip-stop element 10 is prevented.

Figure 11:
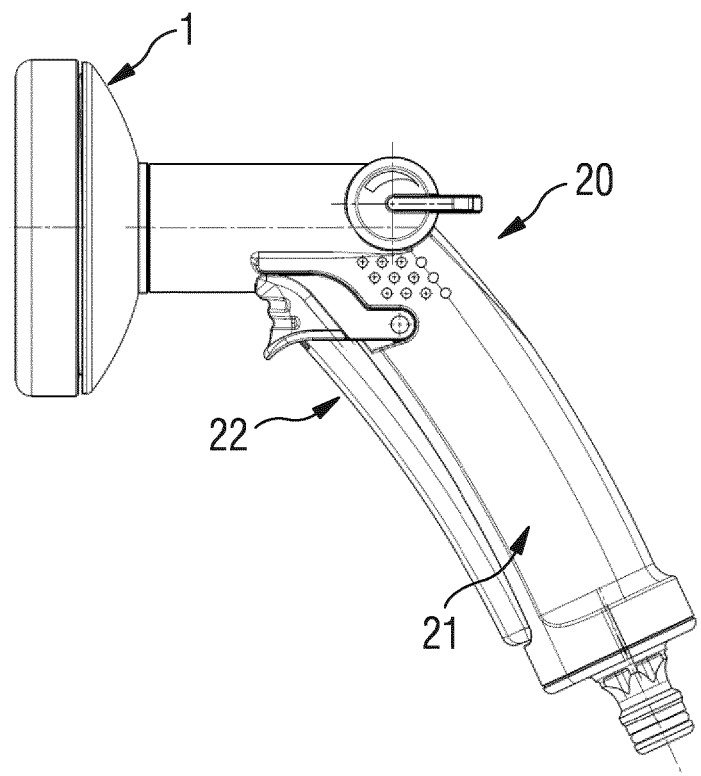
FIG. 11 shows a hand-held spraying apparatus including a spray head according to the present invention.

The spray head 1 described above may be used in a spraying apparatus 20 shown in FIG. 11. The spraying apparatus 20 may be a handheld device, e.g. a spray gun, for providing liquid, specifically water to liquid receiving objects, for example flowers or plants. According to another embodiment, the spraying apparatus 20 may be a shower head in sanitary installations. The spraying apparatus 20 may comprise a housing with a grip portion 21 for manually holding the spraying apparatus 20. The spraying apparatus 20 may further comprise a valve assembly comprising at least one liquid valve included in the interior of the spraying apparatus 20. In addition, the spraying apparatus 20 may further comprise activation means 22, e.g. a button, said activation means 22 being coupled with said valve assembly for enabling/disabling or controlling a liquid flow through the spraying apparatus 20.

It should be noted that the description and drawings merely illustrate the principles of the proposed methods and systems. Those skilled in the art will be able to implement various arrangements that, although not explicitly described or shown herein, embody the principles of the invention.

LIST OF REFERENCE NUMERALS 1 spray head
2 spray head base body
2.1 protrusion
2.2 vent opening
2.3 coupling
3 nozzle plate
3.1 threaded ring
3.2 nozzle
4 liquid channel
5 spray head chamber
6 space
7 support element
7.1 elastic rib
7.2 vent opening
7.3 protrusion
8 nozzle
10 drip-stop element
11 opening
12 top portion
13 coupling portion
13a first coupling portion
13b second coupling portion
13.1 leg
13.2 bending portion
14 sealing portion
14.1 recess
14.2 sealing rim
14.3 edge
15 aperture
16 sealing edge
20 spraying apparatus
21 grip portion
22 activation means
FD flow direction

The invention claimed is:

1. Spray head comprising a spray head base body and a nozzle plate, the spray head base body comprising at least one liquid channel for providing a liquid flow towards the nozzle plate, wherein a drip-stop element is located between the spray head base body and the nozzle plate, said drip-stop element comprising at least one opening being fluidly coupled with said liquid channel for providing a fluid flow into a space between the drip-stop element and the nozzle plate, wherein at least a top portion of said drip-stop element is movably mounted within a spray head chamber in order to perform a stroke movement, wherein said top portion is preloaded such that the top portion rests against the nozzle plate and said top portion is lifted off the nozzle plate responsive to a liquid flow being provided through the liquid channel into the space between said top portion and the nozzle plate, wherein the drip-stop element is constituted by a membrane made of an elastic material, and wherein the top portion of the drip-stop element is preloaded towards the nozzle plate, wherein the drip stop element is coupled with the spray head base body by at least one coupling portion, said coupling portion being constituted by flexible U-shaped or zigzag-shaped material portions, with the preload of the top portion of the drip-stop element being generated by the coupling portion.

2. Spray head according to claim 1, wherein the coupling portion is formed as a rolling diaphragm.

3. Spray head according to claim 2, wherein the rolling diaphragm comprises a U-shaped cross section which are built by wrinkles which comprise two parallel or essentially parallel legs coupled via a bending portion.

4. Spray head according to claim 1, wherein the preload of the top portion of the drip-stop element towards the nozzle plate is based on forces caused by the elasticity of the material of the coupling portion.

5. Spray head according to claim 1, wherein the preload of the top portion of the drip-stop element towards the nozzle plate mainly depends on the shore hardness of the coupling portion, material thickness of the coupling portion and length of legs of a U-shaped coupling portion.

6. Spray head according to claim 1, wherein the drip-stop element and the coupling portion is integrally formed.

7. Spray head according to claim 1, wherein the top portion of the drip-stop element is adapted to the contour of the nozzle plate in order to provide a form-fit surface resting against the nozzle plate.

8. Spray head according to claim 1, wherein the drip-stop element comprises a sealing portion providing a sealing between the spray head base body and the nozzle plate.

9. Spray head according to claim 8, wherein the sealing portion comprises a recess for receiving a corresponding protrusion of the spray head base body.

10. Spray head according to claim 8, wherein the sealing portion comprises an angular-shaped sealing rim comprising an acute-angled edge or a slanted sealing lip, said acute-angled edge or the slanted sealing lip interacting with the nozzle plate in order to increase the sealing effect.

11. Spray head according to claim 1, wherein the drip-stop element comprises at least one aperture for providing a spraying nozzle passage.

12. Spray head according to claim 1, wherein the spray head base body comprises at least one vent opening.

13. Spray head according to claim 1, wherein a support element is provided proximate to the drip-stop element in order to limit the movement of the top portion of the drip-stop element.

14. Spray head according to claim 13, wherein the spray head base body comprises one or more elastic ribs, said elastic ribs being adapted to support the restoring properties of the drip-stop element.

15. Spray head according to claim 13, wherein the support element comprises one or more vent openings.

16. Spray head according to claim 13, wherein the nozzle plate and the drip-stop element are constituted by a one-piece element.

17. Spray head according to claim 1, wherein the spray head base body and the nozzle plate are attached by a threaded ring with the spray head base body comprising an external thread and the threaded ring is adapted to be screwed onto that external thread for securing the nozzle plate at the spray head base body.

18. Spraying apparatus comprising a spray head, the spray head comprising a spray head base body and a nozzle plate, the spray head base body comprising at least one liquid channel for providing a liquid flow towards the nozzle plate, wherein a drip-stop element is located between the spray head base body and the nozzle plate, said drip-stop element comprising at least one opening being fluidly coupled with said liquid channel for providing a fluid flow into a space between the drip-stop element and the nozzle plate, wherein at least a top portion of said drip-stop element is movably mounted within a spray head chamber in order to perform a stroke movement, wherein said top portion is preloaded such that the top portion rests against the nozzle plate and said top portion is lifted off the nozzle plate responsive to a liquid flow being provided through the liquid channel into the space between said top portion and the nozzle plate, wherein the drip-stop element is constituted by a membrane made of an elastic material, and wherein the top portion of the drip-stop element is preloaded towards the nozzle plate, wherein the drip stop element is coupled with the spray head base body by at least one coupling portion, said coupling portion being constituted by flexible U-shaped or zigzag-shaped material portions, with the preload of the top portion of the drip-stop element being generated by the coupling portion.

* * * * *